United States Patent [19]

Aignesberger et al.

[11] Patent Number: 4,818,288

[45] Date of Patent: Apr. 4, 1989

[54] DISPERSANT FOR CONCRETE MIXTURES OF HIGH SALT CONTENT

[75] Inventors: Alois Aignesberger, Trostberg; Johann Plank, Saal/Donau, both of Fed. Rep. of Germany

[73] Assignee: SKW Trostberg Aktiengesellschaft, Trostberg, Fed. Rep. of Germany

[21] Appl. No.: 195,425

[22] Filed: May 11, 1988

Related U.S. Application Data

[63] Continuation of Ser. No. 591,197, Mar. 16, 1984, abandoned, which is a continuation-in-part of Ser. No. 439,253, Nov. 4, 1982, abandoned.

[30] Foreign Application Priority Data

Dec. 7, 1983 [DE] Fed. Rep. of Germany ....... 3344291

[51] Int. Cl.$^4$ .......................... B01J 13/00; C04B 7/02; C04B 24/22
[52] U.S. Cl. ........................................ 106/90; 106/102; 106/103; 106/117; 106/4 H; 44/51; 252/312; 252/313.1; 252/353; 252/8.514; 252/8.554
[58] Field of Search ................. 106/90, 102, 103, 117, 106/308 S; 252/312, 313.1, 353, 8.514, 8.554

[56] References Cited

U.S. PATENT DOCUMENTS

| | | | |
|---|---|---|---|
| 841,999 | 1/1907 | Müller et al. | 260/513.7 |
| 2,174,127 | 9/1939 | Henke et al. | 252/353 X |
| 2,432,850 | 12/1947 | Albrecht | 260/513.7 X |
| 2,857,433 | 10/1958 | Bruson et al. | 252/353 X |
| 3,149,152 | 9/1964 | Boehme | 260/513.7 X |
| 3,956,140 | 5/1976 | Nahm et al. | 252/353 X |
| 4,406,702 | 9/1983 | Joseph | 252/353 X |
| 4,657,593 | 4/1987 | Aignesberger | 260/505 |

FOREIGN PATENT DOCUMENTS

| | | |
|---|---|---|
| 543955 | 8/1971 | Australia . |
| 3144673 | 6/1973 | Fed. Rep. of Germany . |
| 2341923 | 7/1977 | Fed. Rep. of Germany . |
| 1436650 | 5/1976 | United Kingdom . |

OTHER PUBLICATIONS

"Chemical Admixtures for Concrete" Cementing.

Primary Examiner—Alan Siegel
Attorney, Agent, or Firm—Felfe & Lynch

[57] ABSTRACT

The invention relates to condensation products of aldehydes and ketones, which contain acid groups and are especially suitable as dispersants for binding agent mixtures of high salt content.

6 Claims, No Drawings

DISPERSANT FOR CONCRETE MIXTURES OF HIGH SALT CONTENT

This application is a continuation of application Ser. No. 591,197, filed Mar. 16, 1984, now abandoned, which is a continuation in-part of Ser. No. 439,253, filed Nov. 4, 1982, now abandoned.

BACKGROUND OF THE INVENTION

Dispersants for inorganic binding agents such as cement or gypsum, for example, have long been known. They are used either for the reduction of the viscosity (plastification) of a suspension of the binding agent at a given water-to-binding-agent factor, or for the reduction of the demand for water while preserving the same consistency.

In his book, "Chemical Admixtures for Concrete" (London 1987), M. R. Rixom describes a total of five chemically different groups of dispersants which are known in modern concrete technology: melamine- and naphthalene-formaldehydesulfonic acid resins, lignin sulfonates, hydroxycarboxylic acid salts and hydroxylated polymers on a polysaccharide basis. In addition, German "Offenlegungsschrift" No. 3,144,673 discloses an additional, novel class of dispersants which consists of keton-aldehyde condensation products containing acid groups.

The action of these known dispersants, however, differs. Rixom describes the melamine- and naphthalene-formaldehydesulfonic acid resins generally as "superplasticizer," since they have by far the greatest dispersing action and produce no undesirable secondary effects. The ketone-aldehyde resins described in German "Offenlegungsschrift" No. 3,144,673 are also reckoned among the "superplasticizer" on account of their excellent dispersing properties. Lignin sulfonates are less effective fluidizers and they also have the disadvantage that, even in their purest, sugar-free form, they decidedly retard cement hydration. Hydroxycarboxylic acid salts and hydroxylated polysaccharides have an even greater retarding action than the lignin sulfonates and can be used only in very small proportions whereby they provide limited dispersing properties.

The dispersants are used, as a rule, in binding agent suspensions in which only small amounts of dissolved inorganic and organic salts, such as sodium or calcium chloride, are contained, In this case the dispersants have the good action described.

In the concrete and cementing technology, however, it is sometimes necessary to prepare binding agent suspensions having contents of soluble inorganic and organic salts of as much as 30% of the weight of the cement content. Examples of this are concreting in cold climates, when calcium chloride and calcium nitrate, particularly, are used in concentrations of 2 to 5 weight-percent as hardening accelerators, or concreting with sea water as mixing water in cases in which fresh water is not available. Concreting in mines, too, often makes necessary the use of saturated sodium chloride solution as the mixing water in order to achieve good strength of adherence of the concrete to saliferous rock. Other examples of the use of binding agent suspensions with a content of soluble inorganic and organic salts are to be found in well cements used in oil, gas and water well drilling. To prevent swelling in clayey deposits and to achieve a tight bond between the cement paste and the formation it is necessary to add salt when preparing the slurry. Furthermore, in the case of offshore drilling only salty sea water is available as the mixing water.

The person skilled in the art knows, however, that melamine- and naphthalene-formaldehyde-sulfonic acid resins as well as lignin sulfonates rapidly lose their good dispersing action when the content of the above-mentioned inorganic and organic salts in the binding agent suspension is high (cf., e.g., D. K. Smith "Cementing" (New York 1976, p. 25)). Some of the hydroxycarboxylic acids and hydroxylated polysaccharides in high proportions are effective dispersing agents even in the presence of salts. In practice, however, additives from these two groups of substances are not usable, since they greatly retard cement hydration when used in the large proportions necessary for a good dispersing effect, and thus they are unsuitable for the economical advancement of construction on account of the poor development of strength.

It is therefore the object of the invention to devise a dispersant for the preparation of binding agent suspensions having relatively high contents of soluble inorganic and organic salts, which can be used in economically feasible proportions, and which at the same time will have no undesirable secondary effects with regard, for example, to the development of strength in the binding agent.

THE INVENTION

This object is achieved by a dispersant for salt-containing concrete mixtures on the basis of a condensation product of ketone, aldehyde and a compound introducing acid groups, which is characterized in that it contains the components, namely, ketone, aldehyde and the compound introducing acid groups, in a molar ratio of from 1:1 to 18:0.25 to 3.0, and has been prepared by the reaction of these components at a temperature between 60° and 85° C.

The properties of the dispersant of the invention are surprising to the extent that, of all the many naphthalene- and melamine-formaldehyde-sulfonic acid resins manufactured on different principles of synthesis and offered today on the market, not a single one is known which has satisfactory dispersing properties in salty systems, and even the other groups of dispersants (lignin sulfonates, hydroxycarboxylic acids and hydroxylated polymers on a polysaccharide basis) are unsuitable for this purpose.

The maintenance of a temperature of 60° to 85° C. during the preparation of the condensate from the three components, ketone, aldehyde and a compound introducing acid groups, is of decisive importance for the achievement of a lasting dispersing action in the highly salty system. If this temperature is exceeded during the condensation, the effectiveness in these very salty systems is rapidly lost. Likewise, a useful product is not obtained if the reaction has been performed at a temperature below 60° C.

The condensation products of the invention can contain, as ketones, symmetrical or asymmetrical ketones with acyclic hydrocarbon moieties which have preferably 1 to 3 carbon atoms. The term, "acyclic moieties," as used herein, refers to straight-chain or branched, unsaturated and, preferably, saturated alkyl moieties such as, for example, methyl, ethyl and isobutenyl.

The ketones can also be substituted by one or more substituents which do not impair the condensation reaction. They can be substituted, for example, by methyl, amino, hydroxy, alkoxy or alkoxycarbonyl groups having preferably 1 to 3 carbon atoms in the alkyl groups, and/or by the acid groups contained in the condensation products.

Preferred examples of suitable ketones are acetone and diacetone alcohol. Other examples are: methyl ethyl ketone, methoxyacetone and mesityl oxide.

The moiety R of the aldehyde R—CHO can be hydrogen or an aliphatic moiety in which the number of carbon atoms amounts preferably to from 1 to 3, and R is, for example, methyl, ethyl or propyl. The aliphatic moieties can also be branched or unsaturated, and in that case they are, for example, vinyl moieties.

The aldehydes can also be substituted by one or more substituents which do not interfere with the condensation reaction, for example by amino, hydroxy, alkoxy or alkoxy-carbonyl groups having preferably 1 to 3 carbon atoms in the alkyl groups and/or by the acid groups contained in the condensation products. Aldehydes with more than one aldehyde group, e.g., di- or trialdehydes, can be used, which, on account of their elevated reactivity, may be especially suitable in some cases. In the case of formaldehyde, for example, or acetaldehyde, the polymeric forms (e.g., paraformaldehyde or paraldehyde) can also be used.

Examples of saturated aliphatic aldehydes are formaldehyde (or paraformaldehyde), acetaldehyde (or paraldehyde); examples of substituted saturated aliphatic aldehydes are methoxyacetaldehyde and aldol; examples of unsaturated aliphatic aldehydes are acrolein and crotonaldehyde; examples of dialdehydes are glyoxal and glutardialdehyde. Formaldehyde and glyoxal are especially preferred.

The condensation products of the invention contain, as acid groups, preferably carboxy groups and especially sulfo groups, these groups being also able to be bound by N-alkylene bridges, and are then sulfoalkylamino groups. An alkyl group in these moieties has preferably 1 to 2 carbon atoms, and is especially methyl or ethyl. The condensation products of the invention can also contain two or more different acid groups, Preferred are sulfites as well as organic acids with at least one carboxy group.

The aldehydes and ketones can be used in pure form, but also in the form of compounds with the substance introducing the acid groups, such as for example an aldehyde sulfite addition product. Two or more different aldehydes and/or ketones can also be used.

Additional subject matter of the invention is the preparation of the new dispersants. In accordance with the invention, they are produced by reacting ketone, aldehyde and a compound introducing acid groups, in a molar ratio of 1:1 to 18:0.25 to 3.0, at a pH of 8 to 14 and a temperature between 60° and 85° C.

In the preparation of the new dispersants, ketone and the compound introducing acid groups are placed in the reactor, and then the aldehyde is added under the temperature conditions stated above. The concentration of the solution is basically unimportant, but at higher concentrations, care must be taken to provide for effective cooling so that the upper temperature limit of 85° C. is not exceeded. Normally, however, it will suffice to control the condensation temperature by controlling the rate of addition of the aldehyde and of the aldehyde concentration, if used.

Alternatively, it is also possible to place the aldehyde and the compound introducing acid groups in the reactor and then add the ketone, preferably acetone or diacetone alcohol.

Likewise, it is possible to place only one of the three components in the reactor and add the other two, premixed, as an addition product for example, or separately, and especially to place only the ketone or only the aldehyde in the reactor and add the other two components.

As mentioned above, a pH of 8 to 14 is maintained during the reaction, preferably a pH of 11 to 13. The pH adjustment can be performed by the addition of hydroxides of univalent or bivalent cations or by presenting the acid in the form of a compound introducing acid groups, such as alkali sulfite, which hydrolyzes in an aqueous solution with an alkaline reaction.

The reaction can be performed both in homogeneous and in heterogeneous phase. The reaction medium is, as a rule, water or a mixture containing water in the amount, preferably, of at least 50% by weight. The nonaqueous components of the mixture can be polar organic solvents such as alcohols or acid esters, for example.

The reaction can be performed either in an open vessel or in an autoclave, and it may be desirable to perform it in an inert gas atmosphere—under nitrogen, for example.

Directly after the addition of the last component of the reaction a thermal aftertreatment of the product can be performed, using temperatures, for example, between 40° C. and 150° C. This aftertreatment is recommendable under certain circumstances for the achievement of a uniform product quality.

The condensation products, if desired, can be isolated from their solutions or dispersions obtained after the reaction, for example by concentration in the rotary evaporator, or by spray drying. The solutions or dispersions, however, can also be used directly as they are.

In accordance with the invention it is possible to maintain high solid concentrations in the manufacturing process, which can amount to as much as 60%. Such high solid concentrations have the advantage that subsequent concentration for shipment is not necessary or is easier, and even if the product is to be dried, less solvent has to be removed from it. On the other hand, in the higher concentrations the maintenance of the necessary narrow temperature limits entails greater difficulty.

By means of the invention is becomes surprisingly possible to achieve the same advantages in cementing systems in a very salty environment, which with the dispersants known heretofore could be obtained only in a salt-free, or in any case an only slightly salty environment.

The salts in the cementing systems are inorganic or organic salts of univalent, bivalent and trivalent cations. For example, they can be the chlorides, carbonates, nitrates or acetates of the alkali and alkaline earth metals, ammonium, or aluminum. The salts can be present in the cement mixtures in pure form or as a mixture of several salts, as in the case of sea water, for example.

For the dispersing action of the condensation products of the invention, it is unimportant whether the salts are contained in dissolved form in the mixing water or whether they come into the system in dry form, for example, with the binding agent or the additive.

Also, the condensation products of the invention can be dissolved in the mixing water, or they can also be dry blended with the binding agent or additive.

The binding agents can be any cement-bound systems, such as Portland cements, blast furnace slag cements, fly ash cements, trass cements or high alumina cements of the various types as regards strength class or having special characteristics such as resistance to sulfates, for example.

The invention accordingly makes it possible to prepare hydraulic binding agents in a highly salty environment, and nevertheless to drastically reduce the amount of mixing water required, with the known advantages as regards high early strength, shortening of the curing time, and improvement of the strength of the cured product. Applications of this kind include, for example, pouring concrete in a salt bed using saturated sodium chloride solution as mixing water for the achievement of sufficient strength of adhesion of the concrete to the salt rock, or the production of cement slurries containing large proportions of calcium chloride as accelerator.

Furthermore, condensation products of the invention make possible, for example, the preparation of very fluid oil well cement slurries using sea water as the mixing water, which offers great advantages especially on offshore oil drilling sites. Also possible is the filling in of drilling holes with sodium chloride-saturated cement slurries, which are necessary in the cementing of clayey strata.

EXAMPLES

The following examples will explain the invention:
A. Examples of Manufacture

Condensation products in accordance with the invention having dispersing action in mixtures containing salt are obtained, for example, by following the manufacturing instructons A-1 to A-4.

Powders of the resin product described therein can be obtained from the solutions by common drying methods, such as vacuum drying or spray drying.

Example A-1

In an open reactor having a stirrer, temperature gauge and reflux condenser, 6,500 weight-parts of water, 788 weight-parts of sodium sulfite, and 1,450 weight parts of acetone are placed successively, in that order, and are stirred vigorously for several minutes.

Then the mixture is heated to the boiling point of the acetone, and a total of 3,750 weight-parts of 30% fomaldehyde solution (formalin) is added, while the temperature of the reaction mixture is allowed to rise to 75° C. After the addition of the aldehyde is completed, the mixture is maintained for another hour in a temperature range of around 95° C.

The cooled solution of the condensation product has a solid content of 19% and a strongly alkaline reaction. The product is suitable, for example, for the dispersing of oil well cement slurries with a high sodium chloride content.

Example A-2

In the reaction vessel of Example A-1, 1400 weight-parts of water, 630 weight-parts of sodium sulfite, 580 weight-parts of acetone and 2,850 weight-parts of 30% formaldehyde solution were brought to reaction by appropriately applying the instructions of Example A-1. During the addition of the formaldehyde, cooling was applied to the reaction mixture to prevent the temperature from rising above 85° C.

The resin solution thus obtained is slightly viscous and has a solid content of 32%.

The active substance of the resin solution is an excellent dispersant for systems containing salt, and can be used, for example, for the production of concrete using saturated sodium chloride solution as the mixing water.

Example A-3

Following the instructions given in Example A-1, 1,105 weight-parts of water, 4949 weight-parts of sodium sulfite, 377 weight-parts of acetone, and 1,950 weight-parts of a 30% formaldehyde solution were brought to reaction.

The slightly viscous solution of the condensation product has a solid content of 28% and a pH of 13.6.

The resin is suitable, for example, for the plastification of mortars containing calcium chloride.

Example A-4

360 weight-parts of water, 315 weight-parts of sodium sulfite, 58 weight-parts of acetone and 1500 weight-parts of a 30% formaldehyde solution are reacted as specified in Example A-1, the temperature of the mixture not being allowed to exceed 85° C. The half hour of aftertreatment with heat follows in the same manner.

A resin solution is obtained having a 26% solid content and an alkaline pH.

The condensation product can be used, for example, as dispersant for cement suspensions which have been prepared with sea water as the mixing water.
B. Examples of Application The following examples will explain the effect of condensation products of the invention in the plastification of cementitious systems containing salt.

Cementitious systems are, cement slurries, mortars or concretes made of Portland cements of different strength classes, of blast furnace slag cement, or of different types of oil well cements. The added salts are sodium chloride, potassium chloride, calcium chloride, calcium nitrate, magnesium sulfate, sea salt, and a mixtue of sodium chloride and calcium chloride.

To demonstrate the action of condensation products of the invention, the examples contain a comparison of the special acetone-formadehyde resins with presently known commercial types of dispersants, which for reasons of ease of comprehension have been designated in the tables as follows:

Product A is sulfonated melamine-formaldehyde condensation product,
Product B is naphthalenesulfonic acid-formaldehyde resin,
Product C is sugar-free, purified lignin sulfonate,
Product D is sodium gluconate.

For the comparison testing, only high-quality commercial products of leading manufacturers were used. The dispersants tested were used only in powder form, so as to avoid undesirable effects of dilution when the solutions were added to the salty mixing waters.

The test results present the viscosities of the slurries or the spreads of the concrete or mortar, mixtures as relative values with respect to the blank test without additives which are taken as equal to 100%.

In the comparison of products, this method of representation makes possible a better judgment of the action of the individual additive, and it is for this reason that it has been preferred over a statement of absolute values.

In the preparation of concrete mixtures of high salt content, heavy foaming has often been observed during the mixing process (cf. D. K. Smith, "Cementing", pp. 26–27, New York, 1976). Since air entrapment falsifies the viscosity and spread testing of the individual additives, concrete mixtures having a tendency to froth were defoamed by the addition of small amounts of tri-n-butylphosphate.

B-1 Dispersing of Oil Well Cement Slurries to Which Sodium Chloride is Added

The example describes the action of the condensation products of the invention prepared as in Examples A-1 to A-4 on a slurry for cementing oil wells at elevated temperature.

For this purpose, slurries were prepared in accordance with the standards specified by the American Petroleum Institute (API) in Specification 10, "API Specification for Materials and Testing for Well Cements", January 1982 edition, from an oil well cement of API Class G, with a water-cement factor of 0.44, and sodium chloride was uniformly mixed with the cement in the amount of 9.72% of its weight before mixing the slurries. The salt content of 9.72% of the weight of the cement corresponds to the use of an 18% sodium chloride solution as mixing water, and is used in the practice of well cementing, for example for the purpose of sealing drilled holes against salt-bearing formations. The dispersants to be tested were added and uniformly mixed, like the salt, in powder form, in an amount corresponding to 1.0% of the cement weight, before mixing the slurry. Such well cement slurries tend, on account of their high salt content, to foam, and 0.5 g of tri-n-butylphosphate is added in each case as a foam suppressant.

After the slurries are prepared, they are stirred in accordance with the API standard for 20 minutes in the atmospheric consistometer at 88° C., and then the slurry viscosities are determined with a Fann viscosimeter (Model 35 SA, Rotor-Bob R1B1).

Table I describes the relative slurry viscosities obtained at 600 rpm, the viscosity of the additive-free slurries (blank test) being taken as 100%.

The test results show that the condensation products obtained in accordance with preparation examples A-1 to A-4 have good dispersing action in salty well cementing systems and therefore can be used as viscosity reducers for these slurries. A typical naphthalene-formaldehyde-sulfonic acid resin presently used in the art (Product B), however, fails in regard to the dispersing of the system.

B-2 Plastification of Concrete with Sodium Chloride Added.

The production of concrete with saturated sodium chloride as the mixing water is a problem that arises in mining, where the plastification of the concrete while retaining the water-cement ratio would be very desirable to facilitate the placing. Where this is the problem, which basically might be solved by the addition of suitable dispersants, the plasticizing additives presently offered on the market fail to solve it.

TABLE I

| Dispersing action of condensation products of the invention on a well cementing system containing sodium chloride, at 88° C. | |
|---|---|
| Product | Relative slurry viscosity (%), as measured on the Fann Viscosimeter at 600 rpm |
| Blank test | 100 |
| A-1 | 85 |
| A-2 | 79 |
| A-3 | 83 |
| A-4 | 73 |

TABLE I-continued

| Dispersing action of condensation products of the invention on a well cementing system containing sodium chloride, at 88° C. | |
|---|---|
| Product | Relative slurry viscosity (%), as measured on the Fann Viscosimeter at 600 rpm |
| Product B | 285 |

However, by the addition of a condensation product from Example A-2, the plastification of concrete of high salt content is possible. The sodium chloride-containing concrete is prepared in the following manner:

In a 30-liter pan mixer, 30 kg of aggregates of sieve line B16 is placed together with 4.7 kg of Portland cement of strength class Z 35 F under standard DIN 1045, moistened with 0.5 liter of a saturated sodium chloride solution, and mixed for 1 minute. Then the rest of the sodium chloride solution is added while the mixer drum is running, and mixing continues for 2 minutes. The total amount of NaCl solution is selected such that the concrete obtained has a water-cement factor of 0.65. To avoid excess introduction of air bubbles while the salt concrete is being mixed, 2 ml of tri-n-butylphosphate is added as defoaming agent to the mixing water in each case. The additives in powder form are added in the proportion of 0.5% of the cement weight, and are completely dissolved in the mixing water before the mixing begins.

Following the mixing process, the flow testing of the concretes was performed according to DIN 1048 and the dispersing effect of the additives was judged on this basis.

Table II gives the test results. They show that plasticizers on the basis of melamine resin or naphthalene resin have no dispersing action under these conditions. The condensation product of the invention described in Example A-2, however, makes possible a considerable improvement in the workability of the salt concrete.

B-3 Dispersing a Cement System Containing Calcium Chloride

When calcium chloride is used as a hardening accelerator for cement-bound systems, the use of plasticizers is often desirable. The known superplasticizers on melamine or naphthalene resin basis, however, lose their dispersing action in the presence of high concentrations of calcium ions in the same manner as the lignin sulfonate resins. Hydroxycarboxylic acids, such as sodium gluconate, for example, are also unusable, since in the high proportions that must be used to achieve satisfactory plastification, the development of the strength of the cement-bound system is much too greatly retarded, and thus the action of the calcium chloride accelerator is nullified.

The following mortar tests show how the problem of the dispersing of calcium chloride-containing cement systems can be solved by means of the condensation products of the invention, without disadvantages in the development of strength.

On the basis of German Standard DIN 1164, a mortar is prepared from 450 g of Portland cement of strength class Z 45 F, 1350 g of standard sand, and 235 g of a 5% solution of calcium chloride hexahydrate as the mixing water, using the RILEM-CEM* mixing schedule for the mixing process. Before beginning the mixing, the dispersants in powder form are completely dissolved in the mixing water, and also 0.5 g of tri-n-butyl phosphate is added as defoaming agent.

The flow testing of the mortars thus prepared is performed in accordance with DIN 1164, 1958 Edition, and the one-day and three-day flexural strength and compressive strength tests were performed on the prism-shaped mortar test specimens prepared according to the standard. In holding the specimens over for the 3rd-day strength testing, they were not kept under water after removal from the mold as they are in DIN 1164, and instead the mortar prisms were stored in air at 20° C. and 65% relative atmospheric humidity.
According to standards of the Cembureau (Paris)

TABLE II

Special Testing of Concrete Containing Sodium Chloride with the Addition of Various Dispersants

| Dispersant | Relative Spread of Concrete (%) per DIN 1048 |
|---|---|
| Blank test | 100 |
| Product A | 96 |
| Product B | 91 |
| A-2 | 138 |

The salt concrete was prepared using 26% sodium chloride solution as the mixing water.

The results of the mortar tests are represented in Tables III and IV. From these it can be seen that none of the dispersants available on the market at this time makes it possible, even when very high proportions are used, to obtain a satisfactory plastification of the calcium chloride cement mortars. With an acetone-formaldehyde-sulfite resin prepared in accordance with Example A-1, however, increases can be achieved in the mortar spread of 30 and 43%, respectively. Table III also shows that the development of strength of the mortar, when the product of the invention described in A-3 is used, is not adversely influenced in comparison with the blank test, while lignin sulfonate (Product C), for example, in the same proportion, causes a retardation of the hydration. Sodium gluconate is the only one of the commercial products tested which, beginning at amounts of 0.75%, produces any nearly useful plastification of the calcium chloride-containing system. At these high proportions, however, the retarding effect of the hydroxycarboxylic acid salt is so great that even three days later no determination of strength on the mortar prisms is possible (cf. Table IV). Lower proportions, such as 0.2% for example, do reduce the retardant effect of the sodium gluconate, but then no good dispersion of the system is achieved.

TABLE III

Dispersion of Cement Mortars Containing Calcium Chloride.

| Dispersant | Amount added* (%) | Percentage of Mortar Spread According to DIN 1164 |
|---|---|---|
| Blank test | — | 100 |
| Product D | 0.1 | 108 |
|  | 0.2 | 116 |
| Product A | 0.75 | 104 |
| Product B | 0.75 | 108 |
| Product C | 0.75 | 106 |
| Product D | 0.75 | 124 |
| A-3 | 0.75 | 130 |
| Product A | 1.00 | 107 |
| Product B | 1.00 | 112 |
| Product C | 1.00 | 108 |
| Product D | 1.00 | 125 |
| A-3 | 1.00 | 143 |

*Additions of the dispersant are given as percentages by weight with respect to the cement content of the mortar mixture.

TABLE IV

Strength development of cement mortars containing calcium chloride

| Dispersant | Amount added with respect to cement weight | Strength values (%) | | | |
|---|---|---|---|---|---|
| | | One day | | Three days | |
| | | Flexural Strength | Compressive Strength | Flexural Strength | Compressive Strength |
| Blank test | — | 100 | 100 | 100 | 100 |
| A-3 | 0.75 | 116 | 101 | 141 | 100 |
| Product C | 0.75 | 93 | 82 | 90 | 97 |
| Product D | 0.20 | 80 | 74 | 76 | 94 |
| Product D | 0.75 | 5 | 5 | 5 | 5 |

B-4 Plastification of Cement Mortars Using Sea Water as the Mixing Water

Sea water is an example of a mixing water which, with a total salt content of about 3.5%, contains a mixture of different salts of the alkali and alkaline earth metals. For example, synthetic sea water in accordance with DIN 50900, November 1960 edition, is composed of 985 g of distilled water, 28 g of sodium chloride, 7 g of magnesium sulfate heptahydrate, 5 g of magnesium chloride hexahydrate, 2.4 g of calcium chloride hexahydrate and 0.2 g of sodium hydrogen carbonate.

The following example shows that condensation products of the invention are also suitable for the plastification of cement mortars made with sea water as the mixing water.

For this purpose, a cement mortar is prepared by the method described in example B-3 from Portland cement of strength class Z 35 F and synthetic sea water per DIN 50900, the water-cement factor to amount to 0.50. The additives are completely dissolved in sea water before mixing, and also 0.5 g of tri-n-butyl phosphate is added as defoaming agent. The pour-spread of these mortars is determined on the pour testing table as specified in DIN 1164, 1958 edition.

Table V shows that, with the addition of the special condensation product of A-2, the best plasticizing effect is obtained in the cement mortars.

TABLE V

Spread of mortars using sea water of DIN 50,900 as the mixing water

| Dispersant | Amount added (%) | Spread according to DIN 1164 (%) |
|---|---|---|
| Blank test | — | 100 |
| A-2 | 1.2 | 142 |
| Product A | 1.2 | 127 |
| Product B | 1.2 | 126 |
| Product C | 1.2 | 119 |

B-5 Dispersing Oil Well Cement Systems

The use of sea water as water for mixing cement slurries is frequently necessary in oil well drilling, because in the case of off-shore drilling sites it is unreasonably expensive to bring in fresh water for the purpose. For this reason there is a need in well cementing operations for dispersants whose action is not impaired by the presence of sea water in the slurries.

The following example describes the use of acetone-formaldehyde resins of the invention in accordance with Example A-3 for the viscosity reduction of such cementing systems.

For the production of the well cement slurries, Pozmix A (Registered trademark of Halliburton Co.) is used, which is a sulfate-resistant light cement for well cementing, containing 40% fly ash. In accordance with the standards of the American Petroleum Institute cited in Example B-1, cement slurries are mixed from Pozmix A cement and synthetic sea water of DIN 50900 with a water-cement ratio of 0.48; the mixture is stirred for 20 minutes at 38° C. in the atmospheric consistometer, and then the slurry viscosities are measured on the Fann viscosimeter at 600 rpm, for the test temperature of 38° C. As commonly practiced in well cementing, the dispersants being tested are dry blended with the cement, and 0.5 g of tri-n-butylphosphate is added to the slurries as antifoaming agents.

The test results summarized in Table VI shows the superiority of the dispersant of Example A-3 in sea water cement systems over commercial plasticizing agents on the basis of melamine, naphthalene or lignin sulfonate resin.

TABLE VI

Dispersion of Well Cement Systems Prepared with Sea Water

| Dispersant | Amount Added (%) | Relative Viscosity of Slurries (%); measured on Fann viscosimeter at 600 rpm. |
| --- | --- | --- |
| Blank test | — | 100 |
| A-3 | 0.70 | 52 |
| Product A | 0.70 | 94 |
| Product B | 0.70 | 92 |
| Product C | 0.70 | 157 |

The test temperature during the measurement of the slurry viscosities was 38° C. The stated percentages of the dispersant relate to the weight of the cement in the slurries.

It will be understood that the specification and examples are illustrative but not limitative of the present invention and that other embodiments within the spirit and scope of the invention will suggest themselves to those skilled in the art.

What is claimed is:

1. In a cement or concrete system comprising cement and water containing from 2% up to a saturated solution of a dissolved mineral salt the improvement comprising an effective amount to disperse the cement of a dispersant comprising a condensation product of an acyclic ketone selected from the group consisting of acetone, diacetone alcohol, methyl ethyl ketone, methoxyacetone and mesityl oxide, an acyclic aldehyde selected from the group consisting of formaldehyde, acetaldehyde, methoxyacetaldehyde, aldol, acrolein, crotonaldehyde, glyoxal and glutaraldehyde and an alkali or alkaline earth salt acid-group-introducing compound consisting of an acid selected from the group consisting of sulphurous acid, 2-aminoethanesulphonic acid and aminoacetic acid or wherein said acid-group-introducing compound is a sulfite addition product of the ketone or aldehyde, wherein the molar ratio of ketone:aldehyde: acid introducing compound components is 1:1 to 18:0.25 to 3.0 and said condensation product is formed by a condensation reaction of these compounds at a temperature in the range of about 60° C. to about 85° C.

2. The system of claim 1 wherein at least 3% dissolved salts are present.

3. The system of claim 1 wherein the salt is sodium chloride, potassium chloride, calcium chloride, calcium nitrate, magnesium sulfate, sea salt or a mixture thereof.

4. The system of claim 3 wherein the cement is Portland cement.

5. The system of claim 3 wherein the cement is blast furnace slag cement.

6. The system of claim 3 wherein the cement is an oil well cement.

* * * * *